United States Patent [19]
Capps et al.

[11] Patent Number: 5,345,543
[45] Date of Patent: Sep. 6, 1994

[54] METHOD FOR MANIPULATING OBJECTS ON A COMPUTER DISPLAY

[75] Inventors: Stephen P. Capps; Ernest H. Beernink, both of San Carlos, Calif.

[73] Assignee: Apple Computer, Inc., Cupertino, Calif.

[21] Appl. No.: 977,145

[22] Filed: Nov. 16, 1992

[51] Int. Cl.⁵ .............................................. G06F 15/00
[52] U.S. Cl. .................................................. 395/137
[58] Field of Search ............... 395/155, 161, 133, 137; 345/121, 126; 382/44, 46

[56] References Cited

U.S. PATENT DOCUMENTS 4,928,253  5/1990  Yamauchi et al. ................... 364/521
5,257,349  10/1993  Alexander ............................ 395/159

OTHER PUBLICATIONS

O'Connor, Rory J., "Apple banking on Newtown's brain," San Jose Mecury News, Apr. 22, 1992.
Wieman et al, "A Step Toward the Future" Macword, Au. 1992, p. 129.
M. Soviero, "Your World According to Newton" Popular Science, Sep. 1992.
F. Abatemarco, "From the Editor" Popular Science, Sep. 1992, p. 4.
Apple Computer, Inc. "Macintosh User's Guide" 1991, Chapter 5, pp. 47–50.

*Primary Examiner*—Phu K. Nguyen
*Attorney, Agent, or Firm*—Hickman & Beyer

[57] ABSTRACT

In a method for manipulating a selected object on a computer display of a computer system through the use of a pointing device and a screen based icon, the types of manipulation may include rotating and/or scaling the selected objects. The method includes the step of selecting a manipulating tool having a designated "axle" mark that serves as its center of rotation. The pointing device is directed towards a "handle" portion of the manipulating tool that is spaced apart from the axle to "grab" the handle. The pointing device is then used to rotate the handle about the axle. The computer system then manipulates the selected object by an amount that is a function of the angular distance that the handle is rotated about the axle user interface includes a screen based icon.

17 Claims, 12 Drawing Sheets

METHOD FOR MANIPULATING OBJECTS ON A COMPUTER DISPLAY

BACKGROUND OF THE INVENTION

The present invention relates generally to manipulating images on a computer screen, and more particularly, to methods of rotating, scaling and otherwise altering the image of an object on the screen using an icon-based tool.

As the use of computers becomes more widespread throughout society, greater emphasis is placed on the user interface. One popular approach to simplifying the user interface is to display various graphical items on the computer's display screen. The displayed items commonly take the form of icons, menus and/or windows. When the user desires to perform or initiate a task represented by the displayed item, the user merely selects the icon or the like representing the desired task.

In graphics applications, it is often desirable to manipulate images displayed on the screen of a computer system. For example, a user may wish to rotate or scale (size) an image. Commonly, these functions are accomplished by selecting the items to be manipulated and then entering a suitable keyboard command that indicates the angle by which the image should be rotated, or the factor by which the image should be scaled. Alternatively, some applications require that the user choose the desired scaling or rotation function from a menu and then "stretch" or "rotate" the items through the use of a screen pointer which grabs a "gravity point" or "handle" on the selected item and then scales or rotates the image as a function of the pointer's movement. While such approaches have worked suitably in the past, there are continuing efforts to simplify the user interface, especially for inexperienced users, who often find it difficult to remember which commands or operations are required to conduct a particular operation.

SUMMARY OF THE INVENTION

Accordingly, one of the primary objects of the present invention is to provide a graphical user interface that facilitates easy manipulation of objects displayed on a computer display assembly.

To achieve the foregoing and other objects and in accordance with the purpose of the present invention, a method for manipulating a selected object on a computer display of a computer system using a screen based icon and a pointing device is disclosed. The method includes the step of selecting a manipulating tool icon having a designated mark for its center of rotation. The pointing device is directed towards a portion of the manipulating tool that is spaced apart from the designated mark. The pointing device is then used to rotate the spaced apart portion of the manipulating tool about its designated mark. The computer system then manipulates the selected object by an amount that is a function of the angular distance that the spaced apart portion of the manipulating tool is rotated about the designated mark.

In a preferred embodiment of the invention, the manipulating tool takes the form of a screen based crank icon having an "axle" portion that functions as the designated mark and a "handle" portion that functions as the spaced apart portion. In a further embodiment, the crank icon can be used to rotate the selected objects. In such an embodiment, the axle is preferably positioned at the desired center of rotation of the selected object. The handle is then rotated about the axle by the user and the selected object is rotated about the axle by an amount that is a function of the angular distance the handle was rotated about the axle.

In a product aspect of the invention an improved user interface that includes the screen based crank icon is disclosed.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

The present invention is particularly well suited for pointer based computer systems such as the pen-based, stylus-based and mouse driven systems that are currently popular. For the purposes of illustration, the invention will be described in connection with a pen-based system.

Figure 1:
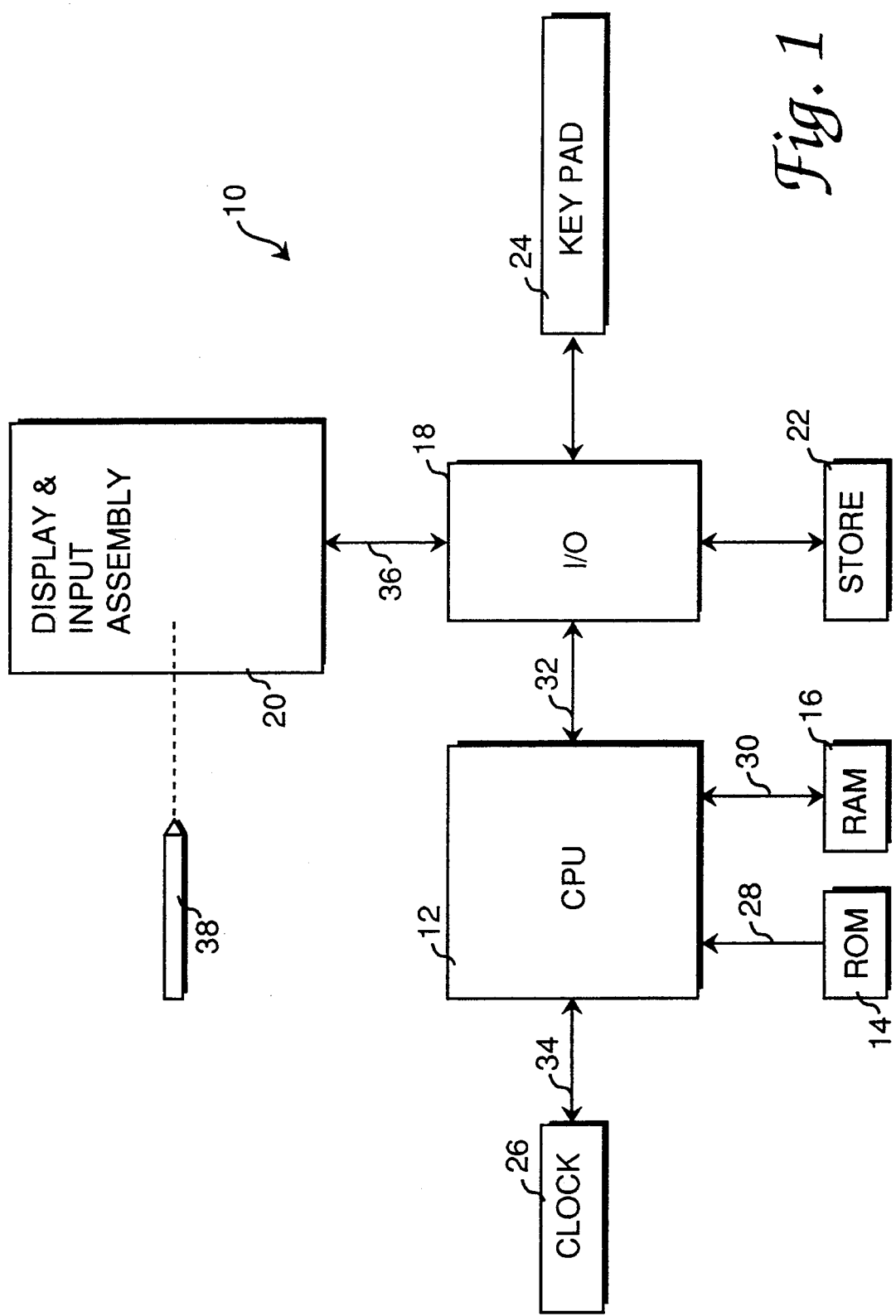
FIG. 1 is a block diagram of a pen-based computer system that incorporates the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled to an interrupt port of CPU 12 by the data line 34. The clock pulses are used to time various functions and events relating to the computer system 10. The clock 26 can be eliminated and the clock function replaced by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are commercially available from such vendors as Scriptel Corporation of Columbus, Ohio.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
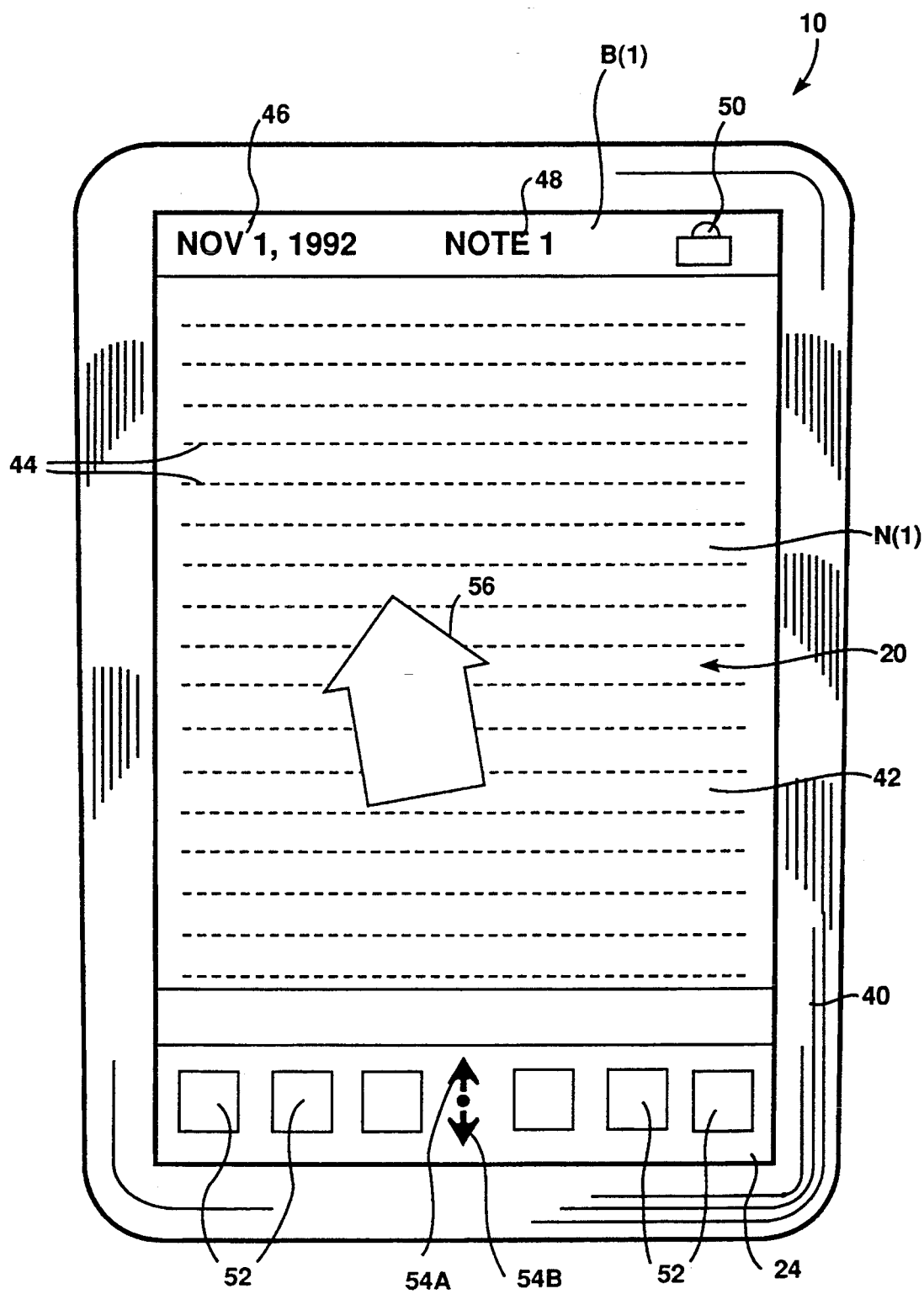
FIG. 2 is a pictorial representation of the screen of a computer display assembly that incorporates the present invention.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N(1) including a header bar B(1) and a number of guidelines 44. The header bar B(1) preferably includes the date of creation 46 of the note N(1), a note number 48, and a "toolbox" button 50 represented by a toolbox icon. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al. and entitled "Method for Manipulating Notes on a Computer Display". That application is assigned to the assignee of the present application and its disclosure is hereby incorporated by reference in its entirety. In this embodiment, the toolbox button 50 is represented as a "soft button" in the header bar B(1). However, in alternative embodiments, a permanent, hardwired keypad button could be used in its place.

As is well known to software programmers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, Object Oriented Programming for the Macintosh, by Kurt J. Schmucher, Hayden Book Company, 1986.

Figure 3:
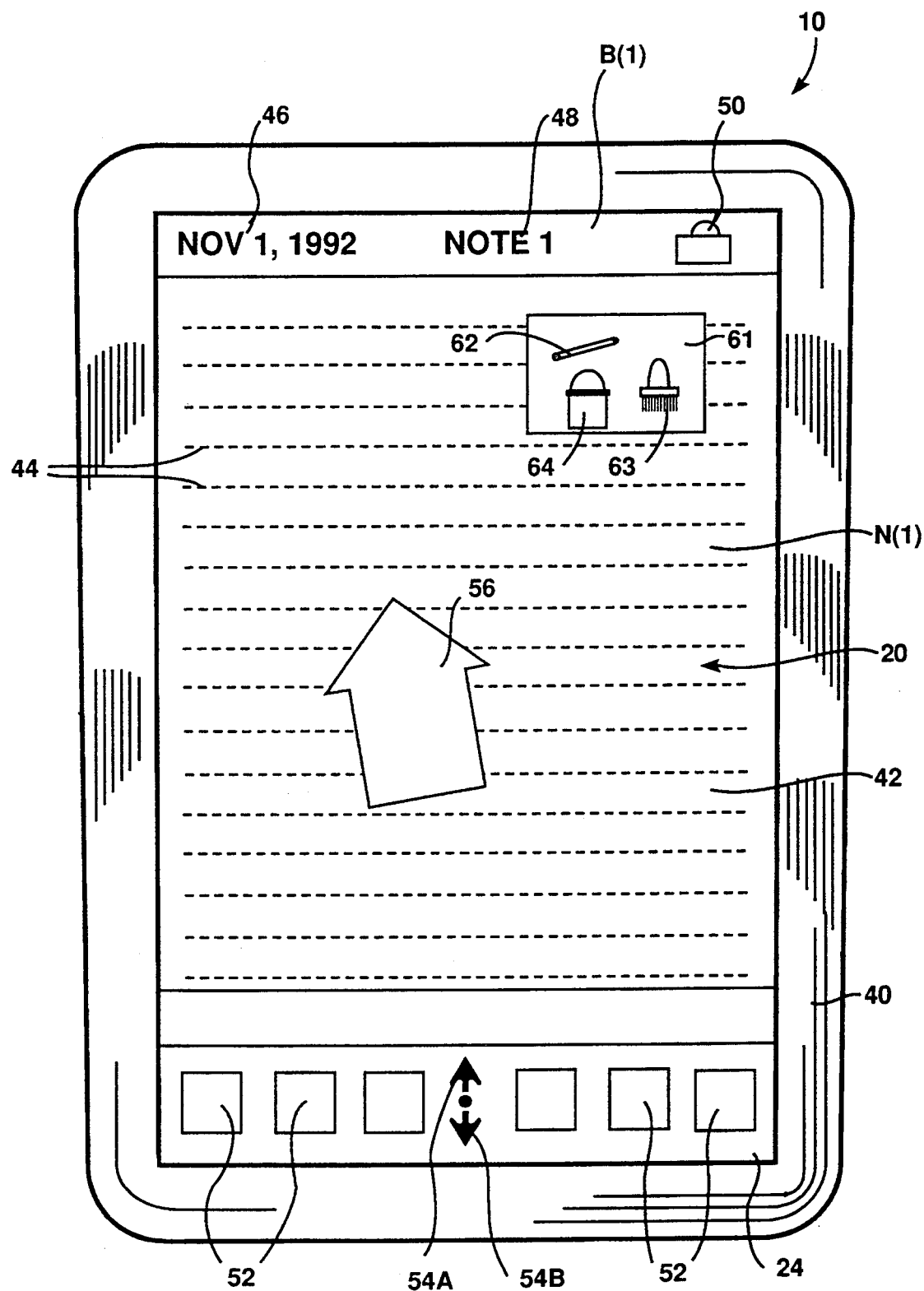
FIG. 3 is a pictorial representation of the screen of the computer display assembly shown in FIG. 2, with the toolbox window displayed.
Figure 4:
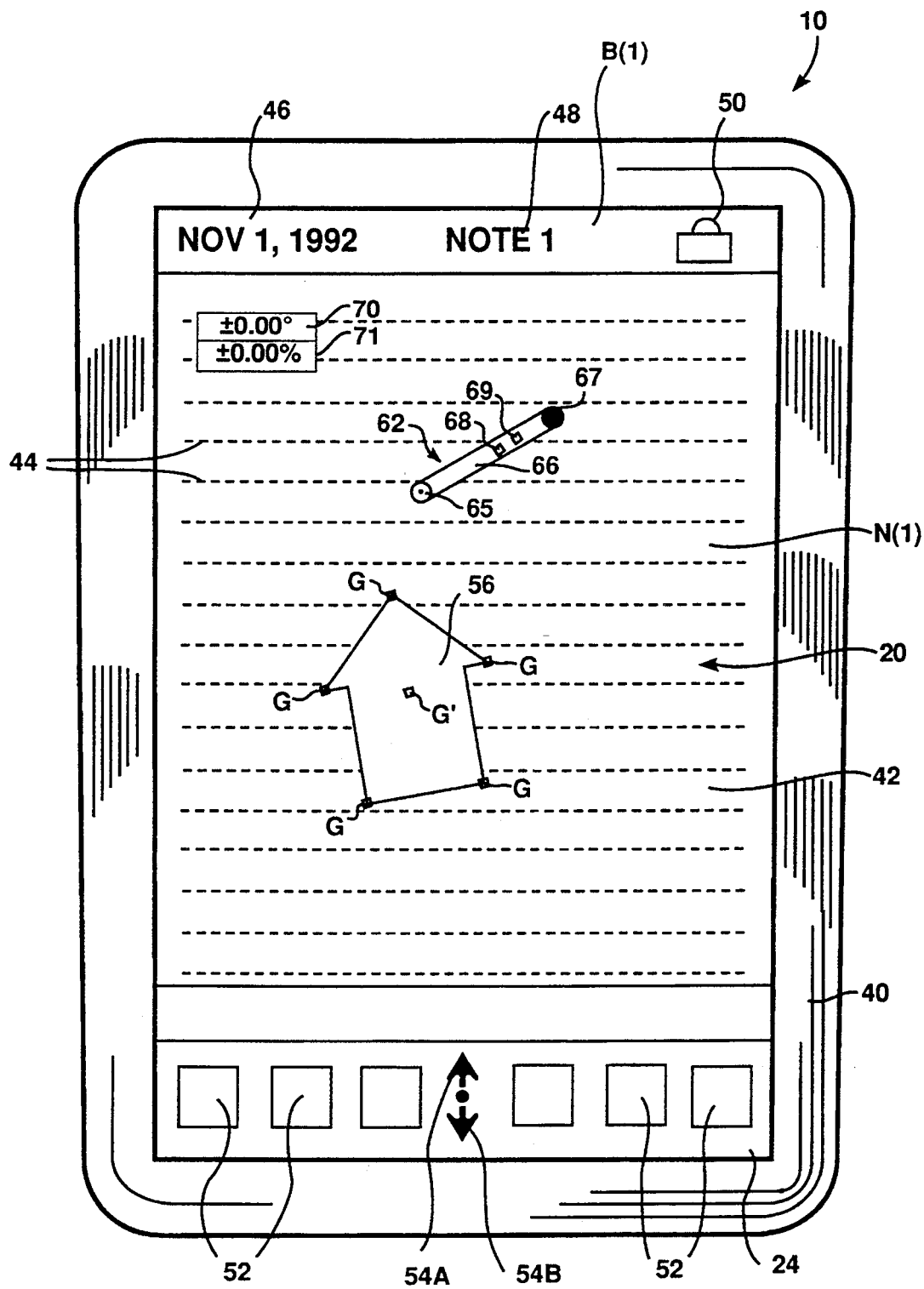
FIG. 4 is a pictorial representation of a crank icon suitable for use with the present invention.

FIG. 2 illustrates a graphical object 56 that takes the form of an arrow. To rotate or scale an object displayed on the screen, the user first selects ("opens") the toolbox, as illustrated in FIG. 3. The toolbox is selected when the user touches the toolbox icon 50 displayed on the screen 42 in the header bar B(1) with the stylus 38. When the toolbox is selected, a small window 61 is displayed including a number of tool icons 62-64. One of the tool icons (62) is a graphical representation of a hand crank. The crank 62 can be dragged out of the toolbox into a location on the screen 42 as seen in FIG. 4. In that location, the crank 62 can be used to manipulate images displayed on the note area N(1) of the screen.

Referring primarily to FIG. 4, it can be seen that the crank icon 62 has an axle 65, a shaft 66 and a handle 67. The upper portion of the shaft 66 includes a plurality of buttons 68-69 which preferably comprise a rotate button 68 and a scale button 69. If the crank is capable of performing other functions, such as distorting the image, other buttons could be provided to set these modes as well.

In order to manipulate an object displayed on the screen 42, the object to be manipulated is first selected by the user. There are, of course, several known methods for selecting objects on a computer screen. A method particularly well suited for selecting objects on the screen of the present invention is described in copending U.S. patent application Ser. No. 07/888,741 entitled "Method for Selecting Objects on a Computer Display", film May 26, 1992, assigned to the assignee of this present application, and incorporated herein by reference in its entirety. Alternatively, an object can be selected by simply dragging the crank to the object. This alternative is an "implicit" selection in lieu of the "explicit" selections mentioned above.

Preferably, the selection of the object will also provide a number of "gravity points" G on or associated with the object. Gravity points are distinctive points associated with the object, and may be provided at corners, at centerpoints, in the middle of lines, etc. A special gravity point G' is at the "center of gravity" of the object, which is a natural center point for rotation and scaling. These gravity points can be stored as a part of the object's parameters, or can be calculated using fairly straightforward heuristics. The gravity points G may or may not be visible on the screen, depending upon developer and user preferences.

The user then touches the stylus 38 against the position on the screen 42 that displays the toolbox 50. This motion "opens" the toolbox window 61 as seen in FIG. 3. Once the toolbox window 61 is open, the user selects the crank by touching the stylus 38 against the hand crank icon displayed within the toolbox and "dragging" the hand crank icon out of the toolbox. At this point, the window 61 disappears, but an enlarged crank as seen in FIG. 4 appears on the screen 42. Alternatively, the crank image (icon) can be made smaller or the same size as the crank image (icon) in the toolbox window 61. Of course, the actual motions required to select the crank 62 can be readily varied to conform with the computer system's (or an application software's) normal selection procedures.

Once the enlarged crank icon 62 appears on the display screen, it may be "dragged" into position by placing the stylus 38 on either the axle 65 or the lower portion of shaft 66. The crank 62 is then "dragged" into position by moving the stylus 38 across the screen 42 to the desired position. As long as the stylus remains on the screen, the crank icon will follow the stylus about the screen. Once the crank 62 is in the desired position, the stylus 38 is lifted off of the screen 42 and the crank icon 62 remains in place.

As will be described in more detail below, in the described embodiment, rotation of an object occurs about the location of the axle 65. Thus, to rotate an object about its center of gravity, the crank 62 is dragged to a position such that the crank axle 65 is placed over the object's gravity point G'. To rotate the object about one of its corners, the crank axle is simply placed over the desired vertex for rotation. Similarly, the objects can be rotated relative to a distant point (such as a point on the screen outside of the object) simply by placing the crank axle at the desired center of rotation. In the described embodiment, scaling is done about the object's gravity point G' (i.e. its center of gravity). However, in alternative embodiments, scaling could be done relative to gravity points or more general locations within or outside of the selected object as well.

As mentioned previously, the selection routine preferably assists the user in locating significant points on an object by providing gravity points G at significant locations. When the stylus is positioned within a predefined range of a gravity point, the CPU then assumes that the user is trying to position the stylus on the gravity point G. This makes it easier for the user to use the crank in a common fashion.

The user can select the desired mode of operation by selecting one of the function buttons 68-69, or a default mode can be selected by the system. Often this will be done before the crank 62 is dragged into position, but it can also occur anytime after the crank has been positioned. Mode selection is accomplished by touching the stylus 38 against the screen 42 at a position directly over the function button 68,69 to be selected. Generally, it is preferable to highlight the selected function button when it has been selected by the stylus to provide user feedback. After a button is selected, the corresponding operating mode will remain selected until the user chooses a different operating mode, i.e. the buttons operate as "radio buttons" where a button remains selected until another button is selected and where only one button can be selected at a time. The selected mode may remain selected even after the crank has been put away, so that the next time the crank appears it will assume the same mode as when it was last used. Alternatively, one of the operating modes can be chosen as the default mode. The default mode would preferably be the most used function. In still another alternative, the crank is limited to only one function (e.g. rotation) and the ability to select operating modes is not required. In this last alternative, several single function cranks could be provided in the toolbox to perform different functions.

To rotate an object using the crank 62, the rotate mode is selected, and the crank 62 is moved to position such that the axle 65 is located at the desired center of rotation. Then the stylus 38 is placed on or near the crank handle 67 and is moved roughly in a circular direction about the axle 65. When the handle is moved in a clockwise direction, the selected objects are rotated about the axle by a corresponding amount in the clockwise direction. Similarly, when the handle is rotated in a counterclockwise direction, the selected objects are rotated about the axle in a counterclockwise direction.

The CPU 12 routinely updates the display assembly so that the selected object rotates as the crank 62 is being rotated. Additionally, a small window 70 may appear on the screen to indicate the actual angle by which the object has been rotated. When the object has been rotated by the desired amount, the stylus 38 is lifted off of the screen 42 and the rotation operation is completed.

An alternative embodiment employs a vernier dial-like effect. For example, a selected object may be rotated once for every N (e.g. 5) rotations of the crank. This vernier-dial effect allows very accurate rotational positioning of an object.

To scale an object, the scale mode is selected. The stylus is then placed on the handle 67 and rotated in a generally circular direction about the axle. If the handle is rotated in a clockwise direction, the object is enlarged. If the handle is rotated in a counterclockwise direction, the object is reduced. In the present embodiment, the amount of enlargement is a linear function of the rotation angle. Thus, one full rotation would double the object's size, two full rotations would triple its size and so on. On the other hand, reduction is done as an inverse function of the rotation angle. Thus, one full counterclockwise rotation would half the object's size, two full counterclockwise rotations would reduce the object to a third of its original size and so on. Like in the rotation mode, a small window 71 may appear on the screen to indicate the object's scaling factor. When the stylus 38 is lifted off of the screen, the scaling operation is completed.

Figure 5:
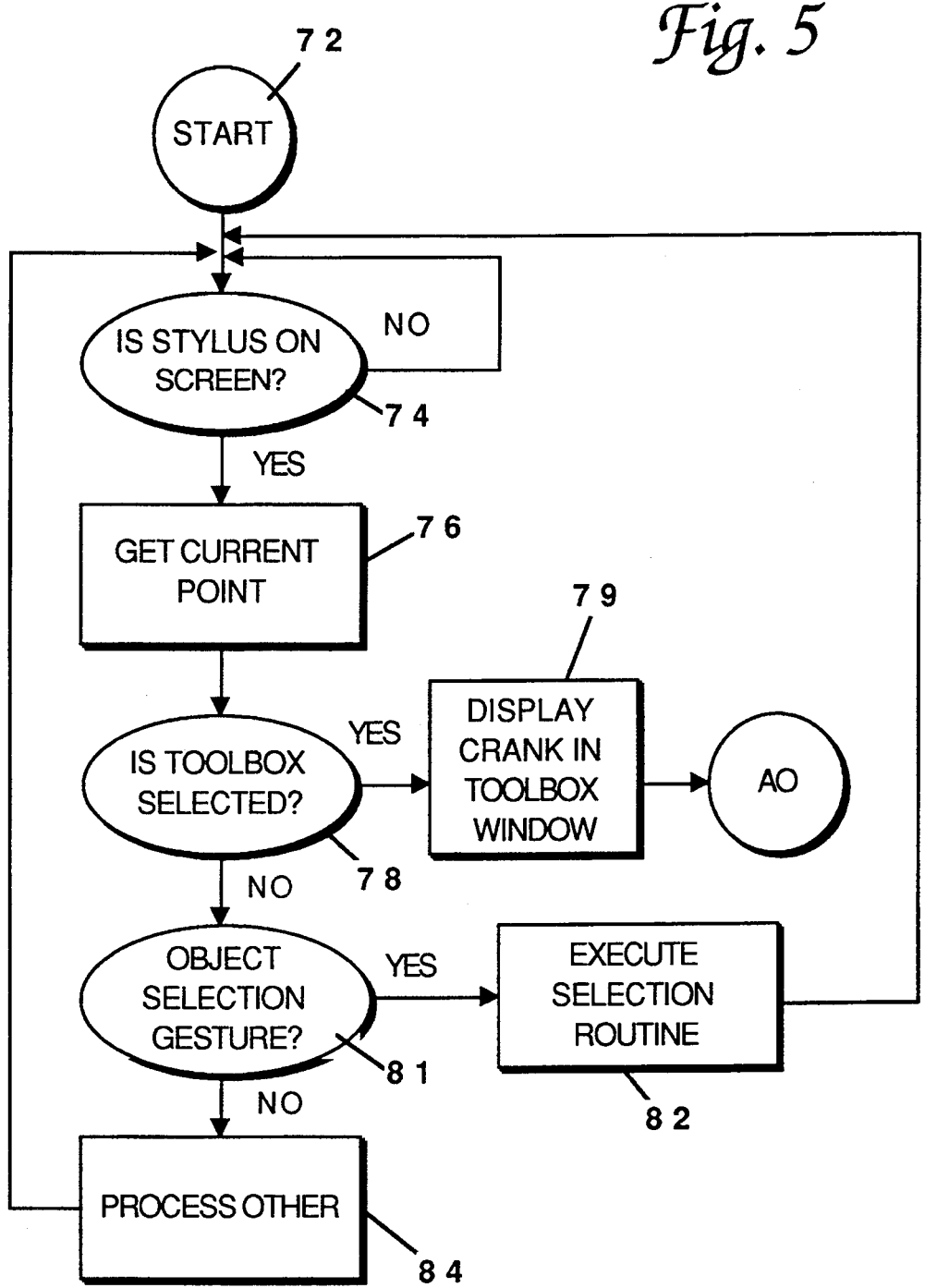
FIG. 5 is a flow diagram of a method of determining whether the toolbox has been selected.

A method for manipulating objects on a computer display in accordance with the present invention begins as is illustrated in FIG. 5. The method begins at step 72. In step 74, the CPU determines whether the stylus is on the screen. If not, the CPU continues to wait for the stylus to be placed on the screen. When the stylus is placed on the screen, the CPU determines the current location of the stylus in step 76. The stylus location is typically reported in cartesian coordinates. Once the stylus location has been determined, in step 78, the CPU 12 compares the stylus position (i.e. the current point) with the known position of the toolbox 50. If the stylus 38 is positioned in the portion of the screen that denotes the toolbox 50, the CPU causes the toolbox window 61 to be displayed on the screen (step 79). Thereafter, process control is transferred to the point indicated at A0 in FIG. 6, which will be described subsequently.

If the stylus 38 is not on the toolbox 50, the CPU 12 seeks to determine where the stylus is positioned and what activities the user wishes to perform. For example, the user may be inputting information, selecting objects displayed on the screen, or activating other "soft" buttons. In step 81, the CPU determines whether an object selection gesture is being made. If so, in step 82, the CPU 12 executes an object selection procedure and then returns to step 74.

When neither the toolbox nor an object are being selected, the CPU 12 will attempt to determine the activity the user wishes to perform in step 84. Once the CPU recognizes a desired activity, it will perform the desired task. When the desired activity has been accomplished, the CPU will return to step 74 to repeat the process. Such possible activities are numerous, and are well known to those skilled in the art.

Figure 6:
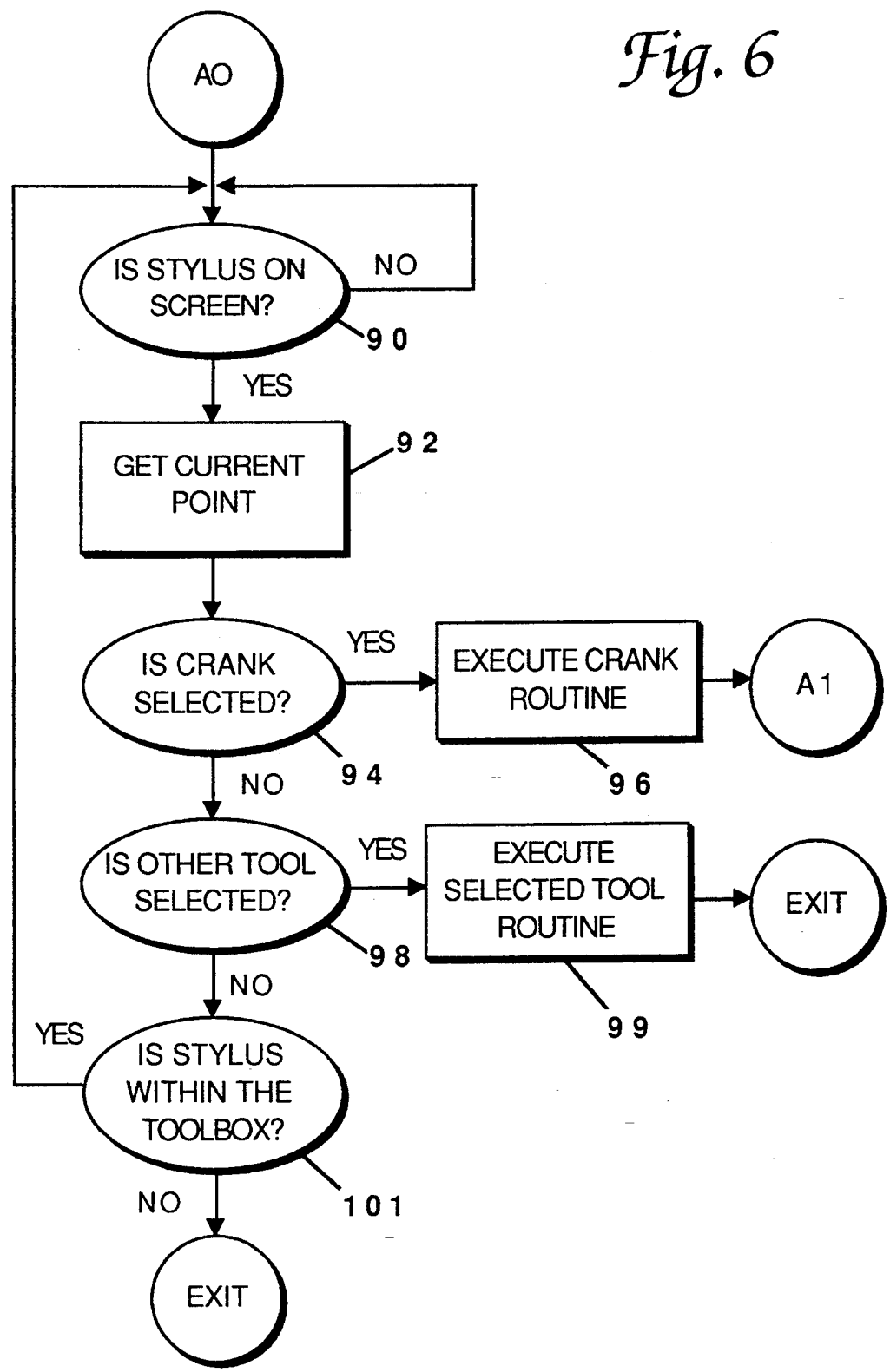
FIG. 6 is a flow diagram of a method of determining which tool in the toolbox has been selected.

The procedure followed when the toolbox is selected will be described with reference to FIGS. 3 & 6. When the tool box 61 is displayed, there may be a variety of icons 62–64 that permit the user to manipulate, add, or subtract to the information displayed on the screen. The crank icon 62 is used to assist the user to rotate and/or scale any selected object or objects displayed on the screen in a note area that is outside of the header bar. Alternatively, separate crank icons could be provided to facilitate the rotation and scaling operations.

In step 90, the CPU again determines whether the stylus is on the screen at a position apart from the toolbox icon. If not, it waits for the stylus to be placed on the screen. When the stylus is detected, in step 92, the CPU interrogates the display assembly 20 to determine the stylus position. In step 94, the stylus position is compared to the crank icon location. If the stylus position and the crank icon correspond in position, then the crank is selected and the CPU seeks to determine what crank operations are to be performed, step 96. If the crank is not selected, then in step 98 the CPU compares the stylus position to the position(s) of the other tools 63, 64 within the toolbox. If the stylus position corresponds to the position of one of the other tools 63, 64, the corresponding tool is selected and the CPU performs the operation of the selected tool in step 99.

If the stylus position does not correspond to any of the tools in the selected window, the stylus position is compared to the window area (step 101). If the stylus position is located within the toolbox 61, the tool selection procedure set forth in steps 90–99 are repeated until an appropriate tool is selected. If, however, the stylus position is determined to be outside of the tool box, the tool selection routine is terminated and the CPU returns to the beginning step 72.

Figure 7:
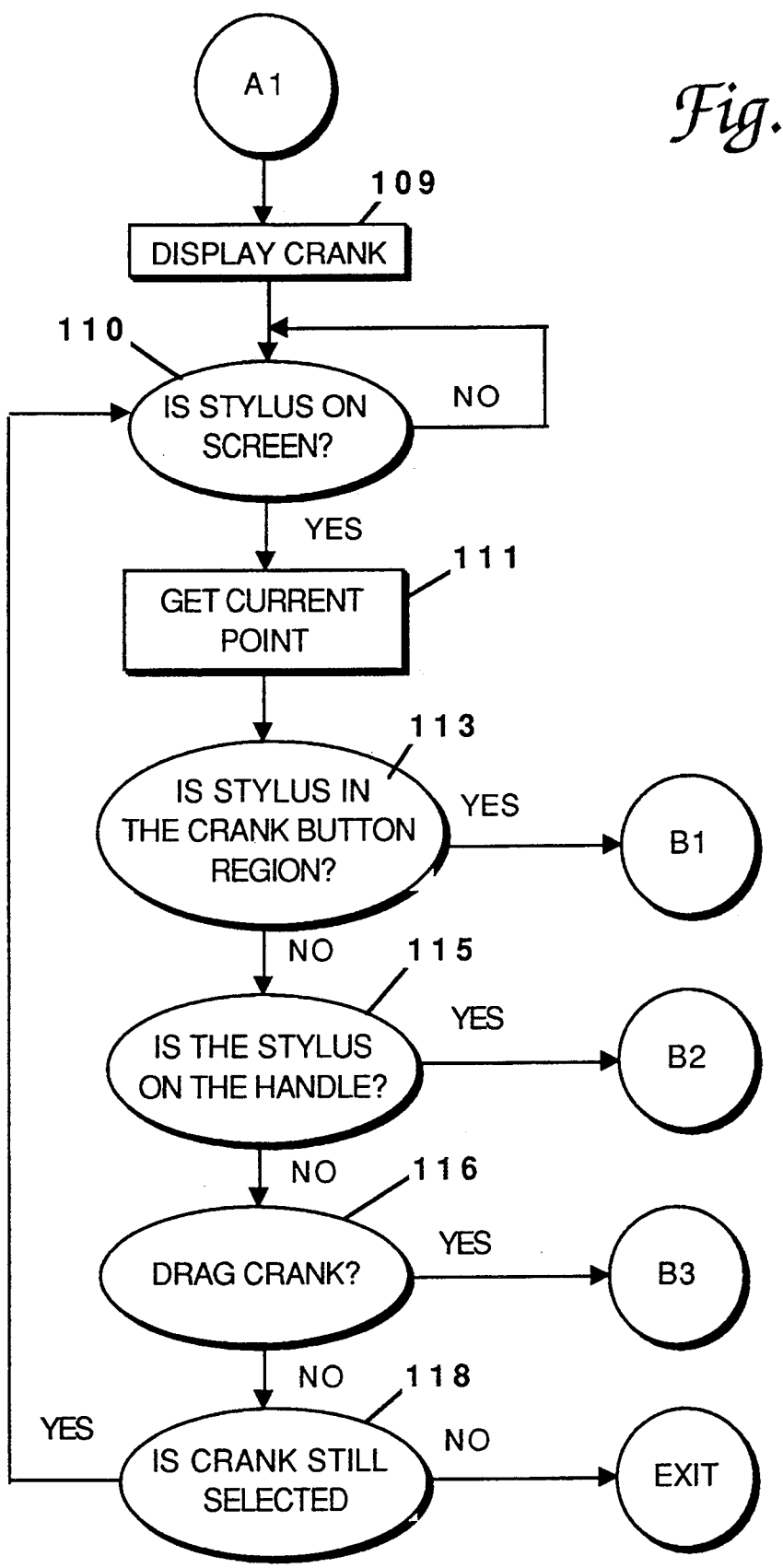
FIG. 7 is a flow diagram of a method of determining the operation which the user wishes the crank to perform.

The operation of the crank will now be described referring first to FIG. 7, which broadly illustrates the method of step 96. Initially, the user drags the crank out of the window 61 and a crank is displayed on the screen 42 (step 109). Again, the crank can be enlarged, reduced, or the same size as the crank in the toolbox. Then, in step 110, the CPU determines whether the stylus is still on the screen. If not, the CPU waits for the stylus to be returned to the screen. When the stylus is detected, the CPU 12 interrogates the display assembly 20 to obtain the current position of the stylus and saves that position. This is referred to as "getting the current stylus point", step 111.

In step 113, the CPU 12 tries to determine whether the stylus 38 is positioned within the crank button region of the crank. If so, the CPU 12 process the procedure of FIG. 8, beginning at B1. This is accomplished simply by comparing the current position of the stylus to the known location of the crank buttons. The crank region may optionally be limited to simply the region of the actual crank buttons or it may include a slightly larger rectangular region surrounding the buttons.

When the stylus 38 is not positioned within the crank button region, the CPU 12 checks to determine whether the stylus is positioned on the crank handle 67. (Step 115) If so, the CPU 12 executes procedure B2 of FIG. 9. If not, it checks to determine whether the stylus 38 is located on the axle 65 or the lower portion of the shaft 66 in step 116. If so, the CPU assumes that the user wishes to drag the crank and moves to procedure B3 of FIG. 10.

If the stylus is not located anywhere on the crank, the CPU 12 must determine whether the crank is still selected (step 118). In the described embodiment, this is done by determining whether the stylus is positioned within a designated distance from the crank. If so, the CPU assumes that the crank is still selected and steps 110-118 are repeated. If the crank 62 is no longer selected, the CPU exits procedure 96 and returns to the beginning at step 72.

Figure 8:
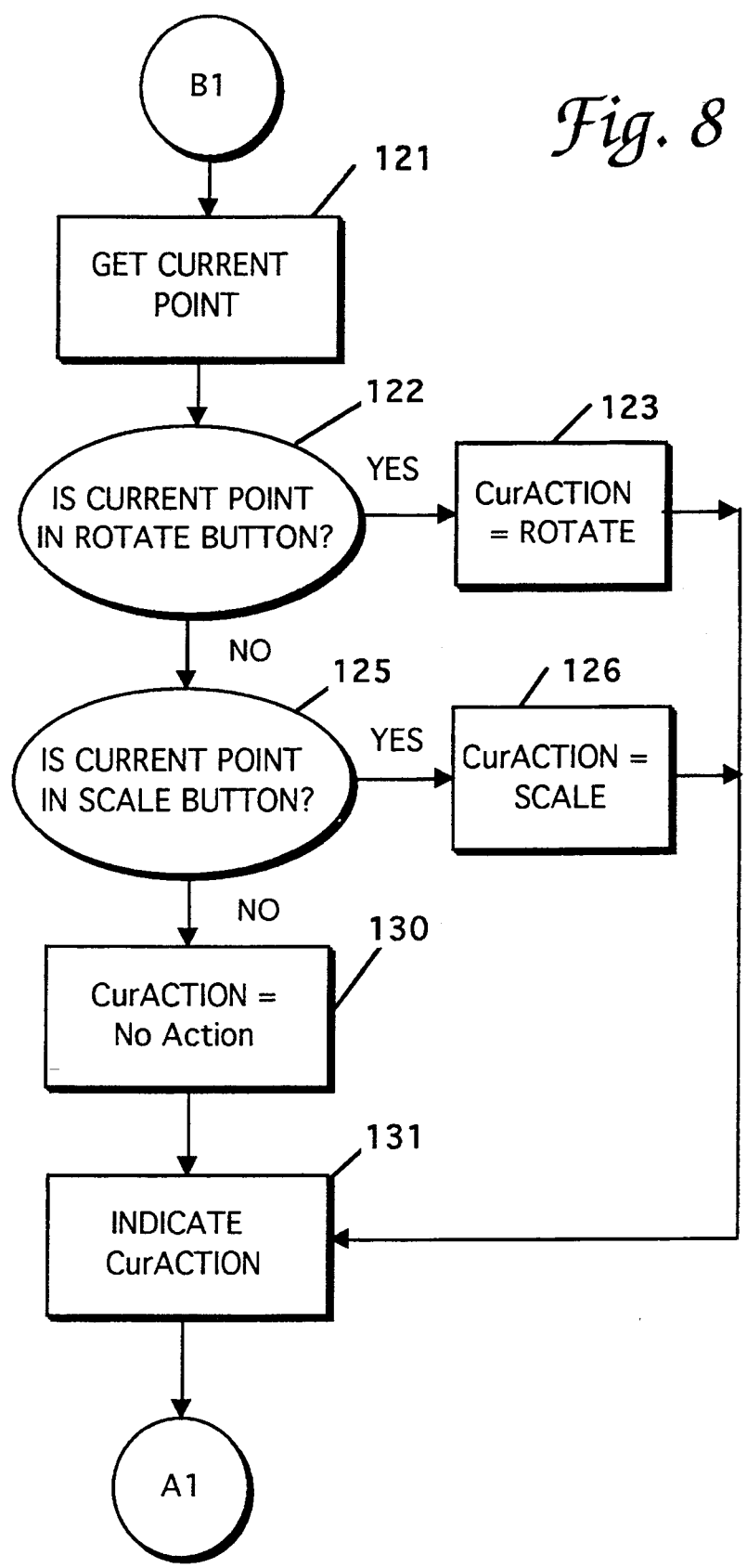
FIG. 8 is a flow diagram of a method of determining which crank button the user has selected.

Turning next to FIG. 8, the method used to select a button will be described. Initially, in step 121, the CPU 12 determines the current position of the stylus by interrogating the display assembly 20. Alternatively, the stylus position determined in step 111 of the previously described routine A1 could be used. This would eliminate the need for step 121.

In step 122, the CPU compares the position of the stylus to the known location of the rotate button 68. If the current stylus position is within the rotate button 68, an internal variable labeled CurACTION is set to ROTATE (step 123). If the current stylus position is not within the rotate button 68, then the CPU 12 checks to determine whether it is within the scaling button 69 (step 125). If so, the CurACTION register is set to SCALE (step 126). If the stylus 38 is not within the scale button 69, the CPU moves to step 130 where it sets the CurACTION register to No Action. After the CurACTION flag has been set by any one of steps 123, 126 or 130, the current action is displayed in step 131 and the CPU returns to A1 and the crank processing routine 96 as described above and shown in FIG. 7.

Figure 9:
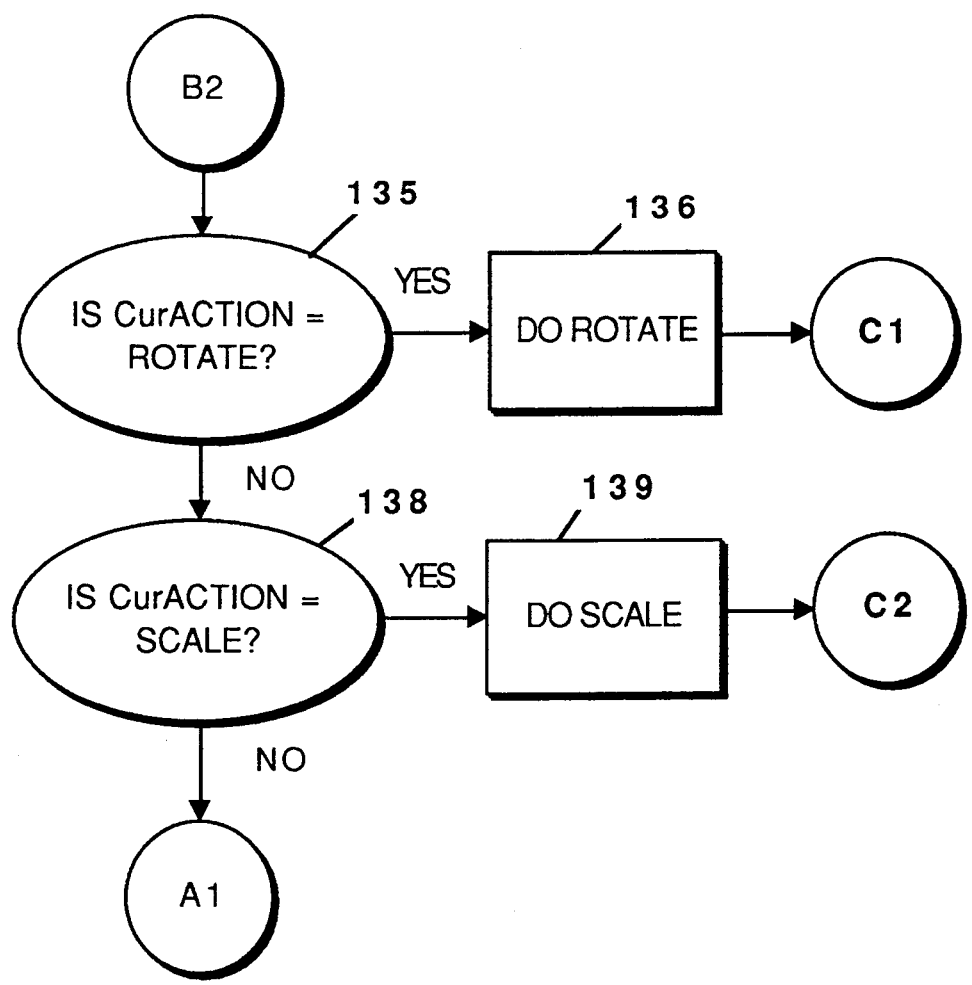
FIG. 9 is a flow diagram of a method of determining the current action to be performed by the crank.

Turning next to FIG. 9, the procedure followed when the stylus is positioned on the crank handle 67 will be described. This process begins at the label B2 in FIGS. 7 and 9. Essentially, the CPU 12 checks the status of the CurACTION register and then performs the appropriate operation. Initially, in step 135, the CPU checks to determine whether CurACTION is set to ROTATE. If so, it performs the rotation operation, step 136 beginning at C1 as will be described below with reference to FIG. 11.

When the CurACTION is not set to ROTATE, the CPU will move to step 138 where it checks to see if the CurACTION is set to SCALE. If so, in step 139, the CPU 12 performs the scaling operation, beginning at C2 as will be described below with reference to FIG. 12. If the CurACTION is not set on either ROTATE or SCALE, then it is assumed that the current action is No Action and the CPU returns to location A1 as shown in FIG. 7. If other buttons are provided to permit additional mode of operation, then of course, those modes would be checked as well before returning to location A1.

In an alternative embodiment, the placement of the stylus on the handle 67 when none of the modes of operation are selected can be interpreted as the user wanting to change the size of the crank icon. This may be desirable since a longer handle provides greater accuracy in controlling the rotating and scaling operations. Conversely, a shorter icon is sometimes easier to use. In such cases, movements of the stylus over the screen serves to enlarge or reduce the length of the crank, with the location of the axle 65 being held constant and the remainder of the crank 62 being modified proportionally with the distance the user moves the handle 67 towards or away from the axle 65.

Figure 10:
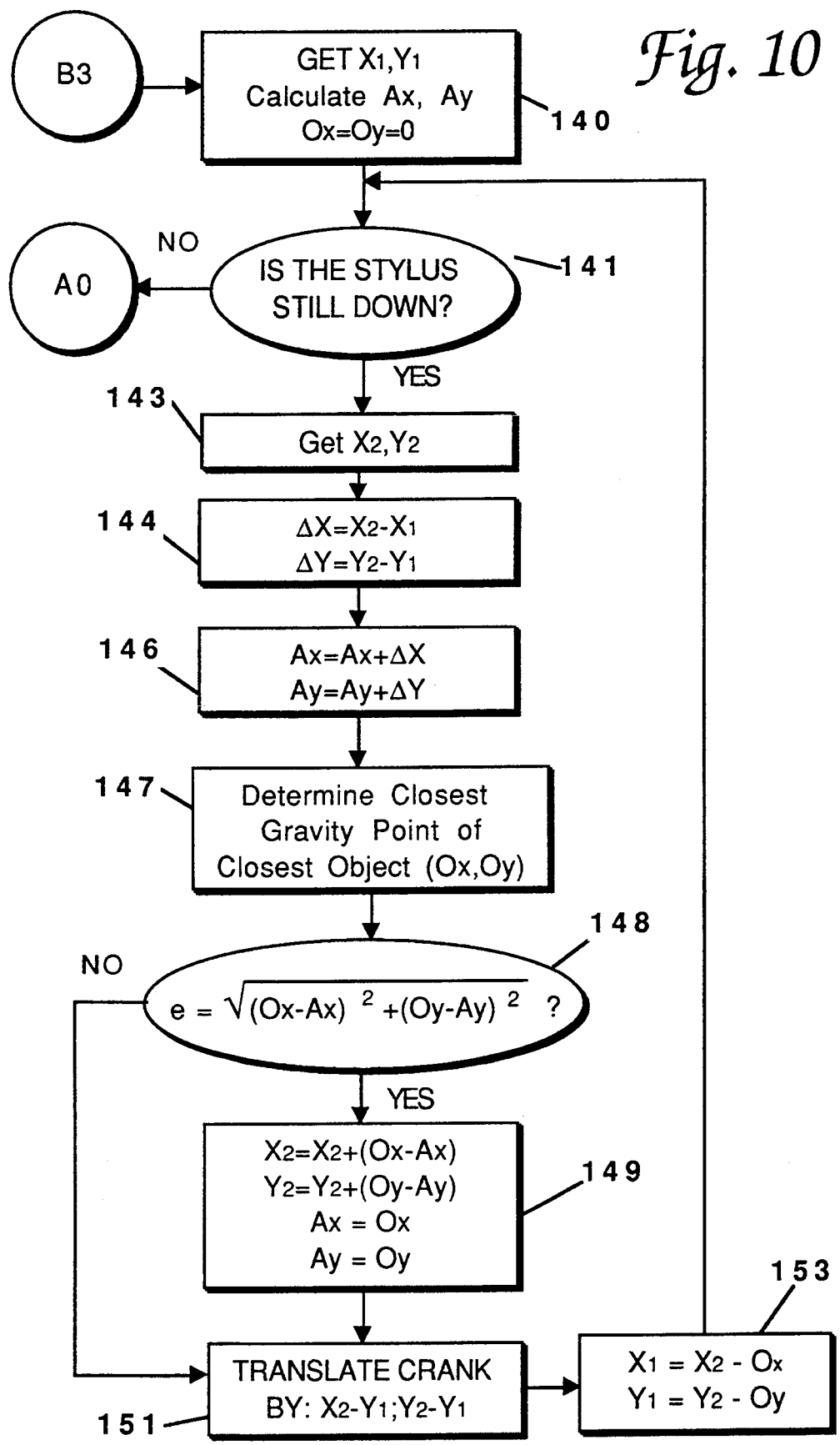
FIG. 10 is a flow diagram of a method of dragging the crank.

Referring next to FIG. 10, the translation algorithm that is used when the crank 62 is being dragged will be described. Initially, the first stylus position $X_1$, $Y_1$ is obtained. This can be done in a separate step 140 as shown in FIG. 10, or preferably, the current stylus position obtained in step 111 of FIG. 7 can be used. Step 140 also calculates or retrieves the coordinates of the axle 65 and stores the x,y coordinates in the variables $A_x$ and $A_y$, respectively. Then in step 141, the CPU 12 determines whether the stylus is still on the screen. If not, the dragging operation is completed and the CPU returns to location A0 (see FIG. 6). If the stylus is still on the screen, its current location is determined by polling the display assembly (step 143). The new location is considered position two, which has coordinates $X_2$, $Y_2$. The CPU 12 then calculates the distance that the stylus has been moved in both the X and Y directions. Step 144. That is: $\Delta X = X_2 - X_1$ and $\Delta Y = Y_2 - Y_1$. Thereafter, in step 146, the updated apparent position of the crank axle 65 ($A_x, A_y$) is calculated by calculating the distance the axle has been apparently moved. That is, a distance equal to $\Delta X$, $\Delta Y$. Thus, $A_x = A_x + \Delta X$ and $A_y = A_y + \Delta Y$.

In the next step 147, the CPU 12 determines which gravity point of the selected object(s) ($O_x, O_y$) is closest to the apparent axle position. This can be accomplished by calculating the distance to each of the gravity points G from the adjusted axle position ($A_x, A_y$), to see which distance is the minimum. After determining the closest gravity point, the CPU calculates the distance between the apparent crank axle position $A_x, A_y$ and the closest gravity point $O_x, O_y$ (step 148), or simply retrieves this distance from the previous step. If the closest gravity point $O_x, O_y$ is less than a predetermined distance e from the apparent axle position $A_x, A_y$, then the desired axle position is assumed to be the gravity point. In such cases, in step 149, the current location $X_2$, $Y_2$ is set to be the position at which the axle position would correspond to the gravity point. This is accomplished by setting:

$$X_2 = X_2 + (O_x - A_x)$$

$$Y_2 = Y_2 + (O_y - A_y)$$

Also, $A_x$ is set to the value of $O_x$ and $A_y$ is set to the value of $O_y$. The crank is then translated by the distance $X_2 - X_1$, $Y_2 - Y_1$ in step 151. On the other hand, if the distance between the apparent axle position $A_x, A_y$ and the nearest gravity point $O_x, O_y$ is greater than the predetermined distance e then the CPU skips directly the crank translation step 151. After the crank has been translated, the values $X_1$ and $Y_1$ are reset equal to the values $X_2 - O_x$ and $Y_2 - O_y$, respectively. (step 153) Finally, the CPU returns to step 141 and the process is repeated until the user lifts the stylus off of the screen.

Figure 11:
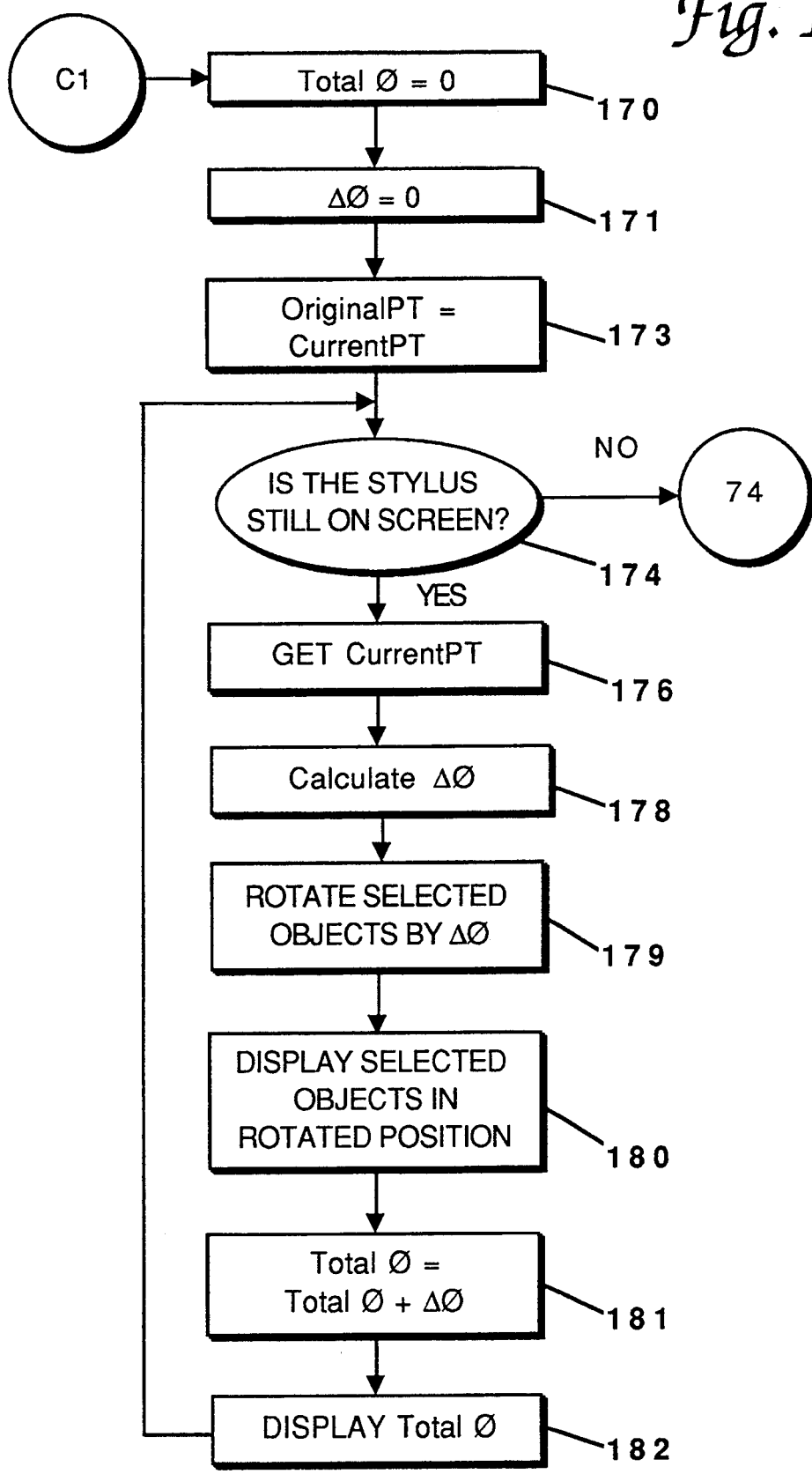
FIG. 11 is a flow diagram of a method of rotating an object in accordance with the present invention.

Turning next to FIG. 11, the rotation algorithm will be described. Initially, the values Total $\phi$ and $\Delta \phi$ are set to zero in steps 170 & 171 respectively. Then, in step 173, the value OriginalPT is set equal to the value CurrentPT, where CurrentPT is the current x,y location of the stylus on the screen. The CPU then interrogates the display assembly 20 to see whether the stylus is still on the screen (step 174). If the stylus is no longer on the screen, the rotation operation is completed and the CPU terminates the rotation algorithm and returns to the step 74 of FIG. 5.

When the stylus 38 is still on the screen, the CPU 12 polls the display assembly 20 to determine the current position of the stylus CurrentPT (step 176). Using basic trigonometric calculations and knowing the current stylus position CurrentPT, the previous position of the stylus OriginalPT, and the position of the crank axle 65, the CPU calculates the angle $\Delta \phi$ by which the crank has been rotated (step 178). It is noted that the angle by which the crank 62 has been rotated can be calculated independently of whether the user movements of the stylus are strictly circular in nature. In the described embodiment, the movements of the crank handle 67 are displayed such that they appear circular, even if the stylus position is well outside of the crank handle's path of rotation. However, in alternative embodiments, the crank 62 can be displayed in a manner such that it appears to stretch and contract as it rotates such that the handle 67 appears to remain under the stylus 38 at all times.

After the angle by which the crank has been rotated ($\Delta\phi$) is calculated, the selected objects are rotated about the crank axle position by that amount. Step 179. The result of these rotations is then displayed on the screen 42 of display assembly 20. Thereafter, the total amount that the object has been rotated, Total $\phi$ is calculated and displayed in steps 181 & 182 respectively. The total rotation is calculated by adding the previous value of Total $\phi$ to the amount just rotated, $\Delta\phi$ That is:

$$\text{Total} = \text{Total } \phi + \Delta\phi$$

Once the value Total $\phi$ has been displayed, the CPU returns to step 171 and the rotation calculation and displaying process is repeated over and over until the user lifts the stylus 38 off of the screen 42.

As seen in FIG. 4, in the described embodiment, a small window 70 appears on the screen to inform the user of exactly how far the object has been rotated in the current rotation action. This gives the user feedback and permits more precise control of the rotation operation. Of course, in alternative embodiments, this feedback could be disabled.

Figure 12:
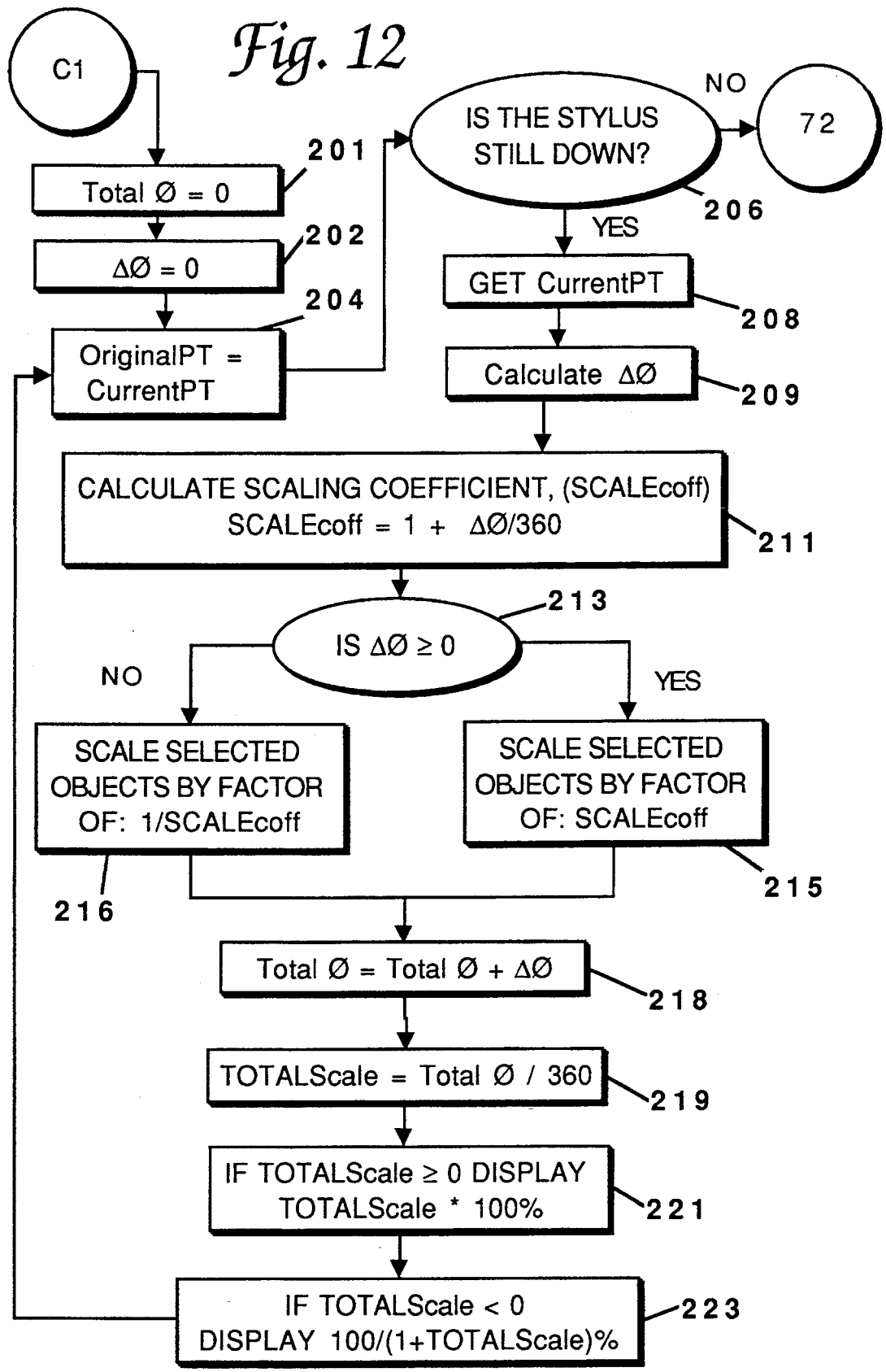
FIG. 12 is a flow diagram of a method of scaling an object in accordance with the present invention.

Turning next to FIG. 12, the scaling routine will be described. In fact, the scaling operation is quite similar to the rotating function. Therefore, as will be apparent to those skilled in the art, the actual code used to perform these functions can be simplified somewhat by combining the rotation and scaling operations. Like the rotating function, the scaling function begins by setting the values Total $\phi$ and $\Delta\phi$ equal to zero (steps 201 & 202 respectively). Thereafter, in step 204, the value OriginalPT corresponding to the current stylus position is set equal to the value CurrentPT.

The CPU then interrogates the display assembly 20 to see whether the stylus is still on the screen (step 206). If the stylus is no longer on the screen, the rotation operation is completed and the CPU terminates the scaling algorithm and returns to the beginning step 72.

When the stylus 38 is still on the screen, the display assembly 20 informs the CPU of the current position of the stylus (step 208). Using basic trigonometric calculations and knowing the current stylus position CurrentPT, the previous position of the stylus OriginalPT, and the position of the crank axle 65, the CPU calculates the angle by which the crank has been rotated (step 209). Thereafter, in step 211, the scaling coefficient "SCALEcoff" is calculated using the formula:

$$\text{SCALEcoff} = 1 + \Delta\phi/360$$

In step 213, the CPU determines whether the scaling coefficient SCALEcoff is greater than or equal to zero. If it is, the selected objects are scaled about their center point by a percentage factor of the scaling coefficient SCALEcoff (step 215). On the other hand, if the scaling coefficient SCALEcoff is less than zero, then in step 216, the selected objects are scaled about their center point by a factor of the inverse of the scaling coefficient. That is:

$$1/\text{SCALEcoff}$$

In either case, the properly scaled objects are displayed on the screen 42 to provide the user with immediate feedback about their actions. Further, in step 218, the CPU 12 calculates the total angle by which the crank has been rotated. This is accomplished simply by adding the rotational angle change $\phi$ to the value Total $\phi$. After the total rotation angle has been calculated, the overall scaling coefficient TOTALScale is calculated (step 219). The overall scaling coefficient calculation uses the following formula:

$$\text{TOTALScale} = \text{Total } \phi \div 360.$$

If the crank has been rotated in a clockwise direction, then an enlargement has occurred and amount of scaling is displayed as a percentage scaling factor in either step 221 or 223. The scaling factor for enlargements is calculated by multiplying the overall scaling coefficient times one hundred. That is: TOTALScale * 100. On the other hand, if the overall crank has been operated in a counterclockwise direction, then a reduction has occurred and the scaling factor is:

$$100/(1+\text{TOTALScale})$$

This total scaling number can be displayed in the window 71 of FIG. 4.

Although only a few embodiments of the present invention have been described herein, it should be understood that the present invention may be embodied in many other specific forms without departing from the spirit or scope of the invention. For example, in the described embodiments, a single crank can be used for both rotation and scaling operations. However, it is contemplated that separate cranks could be provided for each of these functions. Alternatively, the crank can be used to accomplish additional functions such as object distortion as well. Other suitable operations for the crank include adjusting the shading of an object, adjusting the position of an object, scaling an object in a single dimension, distorting an object, etc.

In the described embodiment, the crank icon is "stored" in a toolbox which can be opened by selecting the toolbox. However, it should be appreciated that the crank 62 can alternatively be positioned in any location that conforms with the basic user interface standards of a particular computer system or application software. Further, the rotation of the selected object in the described embodiment was equal to the rotation of the crank handle 67. However, the rotational movements of the selected object can be arranged to be any function of the handle movements.

From the foregoing examples, it should be apparent that the present examples are to be considered as illustrative and not restrictive, and the invention is not to be limited to the details given herein, but may be modified within the scope of the appended claims.

What is claimed is:

1. A method for manipulating an object on a display of a computer system comprising the steps of:
    selecting said object on said computer display;
    directing a pointing means towards a portion of a manipulating tool displayed on said computer display, where said portion is spaced apart from a desired center of rotation;

using the pointing means to rotate the spaced apart portion of the manipulating tool about the center of rotation; and having the computer system manipulate the selected object by an amount that is a function an angular distance that the spaced apart portion of the manipulating tool is rotated about the center of rotation.

2. A method for manipulating an object as recited in claim 1 wherein the manipulation of the selected object is a rotational movement around the center of rotation.

3. A method for manipulating an object as recited in claim 2 further comprising the step of placing a designated mark of said tool proximate said desired center of rotation of the selected object, and wherein the rotational movement of the selected object occurs about the designated mark.

4. A method for manipulating a selected object as recited in claim 1 wherein the manipulation of the selected object is a scaling operation.

5. A method for manipulating a selected object as recited in claim 1 further comprising the step of selecting an operating mode for the manipulating tool, the permissible operating modes including rotation of the selected object and scaling of the selected object.

6. A method for manipulating a selected object as recited in claim 5 wherein the operating mode selection step is accomplished by selecting a button located on the manipulating tool that corresponds to the desired operating mode.

7. A method of rotating a selected object that is displayed on a computer display using a pointing device and a screen based icon having an axle that functions as a designated center of rotation and a handle that is spaced apart from the axle, the method comprising the steps of:

positioning the axle proximate a desired center of rotation for the selected object;

rotating the handle about the axle; and manipulating the selected object by an amount that is a function of an angular distance the handle was rotated about the axle.

8. A method for rotating a selected object as recited in claim 7 wherein the pointer is used to rotate the handle about the axle.

9. A method for rotating a selected object as recited in claim 8 wherein the pointer is used to position the axle relative to the selected object.

10. A method for rotating a selected object as recited in claim 7 wherein the selected object is rotated an amount equivalent to the angular distance the handle is rotated about the axle.

11. A method as recited in claim 7 wherein the icon has two modes of operation, the method further comprising the step of selecting the mode of operation.

12. A method as recited in claim 11 wherein:

a first one of the modes of operation is a rotate mode wherein the selected object is rotated in response to the angular displacement of the crank handle; and a second one of the modes of operation is a scale mode wherein the selected object is scaled in response to the angular displacement of the crank handle.

13. In a computer system having a CPU, memory means, a display screen and a pointer operably connected such that objects can be displayed on the display screen and displayed objects can be selected through the use of the pointer, a user interface comprising:

a crank icon for use in manipulating selected objects that are displayed on the display screen, the crank icon including a crank axle portion that serves as the center of rotation of the crank icon, a crank handle portion that is spaced apart from the crank axle portion, and a crank shaft portion that connects the crank axle portion to the crank handle portion;

crank processing means for permitting the user to engage the handle portion of the crank icon with the pointer and to rotate the crank handle about the crank axle using the pointer; and operating means for manipulating the selected object in accordance with an angular displacement of the crank handle about the crank axle and for displaying the manipulated object.

14. A user interface as recited in claim 13 wherein the operating means rotates the selected object as a function of the angular displacement of the crank handle about the crank axle.

15. A user interface as recited in claim 14 wherein:

the crank processing means permits the user to position the crank icon at any location on the display screen; and the location of the crank axle serves as the center of rotation for the rotation of the selected object.

16. A user interface as recited in claim 13 wherein the operating means scales the selected object as a function of the angular displacement of the crank handle about the crank axle.

17. A user interface as recited in claim 13 wherein the crank icon further includes a plurality of buttons on the crank shaft portion for permitting the user to select a plurality of modes of operation.

* * * * *

UNITED STATES PATENT AND TRADEMARK OFFICE
CERTIFICATE OF CORRECTION

PATENT NO. : 5,345,543
DATED : September 6, 1994
INVENTOR(S) : Capps, et. al.

It is certified that error appears in the above-indentified patent and that said Letters Patent is hereby corrected as shown below:

Column 13, line 7, claim 1, insert --of after function--

Signed and Sealed this

Twenty-fourth Day of December, 1996

Attest:

BRUCE LEHMAN

Attesting Officer

Commissioner of Patents and Trademarks